US006467433B1

(12) United States Patent
Stanton et al.

(10) Patent No.: US 6,467,433 B1
(45) Date of Patent: Oct. 22, 2002

(54) VEHICLE-MOUNTED ANIMAL ENCLOSURE

(76) Inventors: Paul D. Stanton, 4734 W. Harbor St., West Valley City, UT (US) 84120; Connie M. Stanton, 4734 W. Harbor St., West Valley City, UT (US) 84120

( * ) Notice: Subject to any disclaimer, the term of this patent is extended or adjusted under 35 U.S.C. 154(b) by 0 days.

(21) Appl. No.: 09/593,942

(22) Filed: Jun. 19, 2000

(51) Int. Cl.[7] .................................................. B60P 3/04
(52) U.S. Cl. ........................ 119/512; 119/513; 119/514
(58) Field of Search .................................. 119/513, 514, 119/512, 502, 729, 732, 734

(56) References Cited

U.S. PATENT DOCUMENTS

| | | | | |
|---|---|---|---|---|
| 2,678,629 A | * | 5/1954 | Meyer | 119/514 |
| 2,935,965 A | | 5/1960 | Smith | 119/82 |
| 3,726,256 A | | 4/1973 | Bernhardt et al. | 119/20 |
| 3,921,585 A | | 11/1975 | Hall | 119/20 |
| 4,090,472 A | | 5/1978 | York | 119/20 |
| 4,537,151 A | * | 8/1985 | Bolton | 119/512 |
| 4,630,570 A | * | 12/1986 | Wilson et al. | 119/512 |
| 4,821,679 A | * | 4/1989 | Hackert | 119/502 |
| 4,924,813 A | * | 5/1990 | Bixler et al. | 119/848 |
| 5,381,757 A | * | 1/1995 | Putney | 119/512 |
| 5,651,333 A | * | 7/1997 | Fisher | 119/734 |
| D410,289 S | | 5/1999 | Howard et al. | D25/38 |
| 6,067,940 A | * | 5/2000 | Holder | 119/512 |

* cited by examiner

Primary Examiner—Charles T. Jordan
Assistant Examiner—John W. Zerr
(74) Attorney, Agent, or Firm—Kunzler & Associates

(57) ABSTRACT

A plurality of interconnected panels are pivotally mounted to a vehicle for use in forming a portable animal enclosure. The weight of the panels is substantially supported by the vehicle while being pivoted into a deployed position, making it easy for those of slighter stature, such as women, to deploy and configure the portable animal enclosure. Two sets of interconnected panels may be mounted to the vehicle for forming a single enclosure. Additional sets of interconnected panels may be added to form further enclosures. The sets of interconnected panels may be configured into variously shaped enclosures. The interconnected panels may be configured to telescope or nest inside one another when stored on the vehicle, so as to protrude only slightly from the side of the vehicle when in a folded position for transportation or storage.

21 Claims, 7 Drawing Sheets

VEHICLE-MOUNTED ANIMAL ENCLOSURE

BACKGROUND OF THE INVENTION

1. The Field of the Invention

The present invention relates to portable corrals and enclosures for holding animals. More specifically, the present invention relates to a portable enclosure which may be mounted to and transported on a vehicle for use in temporarily confining animals.

2. The Relevant Art

Livestock, such as horses, are often transported to various locations such as camping spots, rodeos, and horse shows in a trailer. The animals often remain at the locations for long periods of time, even over night or over several nights during that period of time. It is not practical to keep the animals in the trailer, and it often becomes necessary to find a suitable place to corral the animals. In many locations it is difficult to find available corral space for the animals being transported, and the cost of renting a corral, stall, or other enclosure to house the animal may likewise be prohibitive. It may also be necessary to allow the animal being transported time to rest and eat during long trips. Portable corrals that attach to livestock trailers have been used in an attempt to solve these problems.

Existing portable corrals nevertheless pose certain problems for those who use them. For instance, many are extremely heavy and awkward, making if difficult for those of smaller stature, such as women, to maneuver them into desired configurations. Additionally, existing portable corrals are generally designed to be stacked in or on the side of the livestock trailer and generally project significantly off the side of the trailer. This makes it difficult to secure the corrals and may create a danger to other vehicles. Also, existing portable corrals are designed to be configured and attached to a trailer in a limited ways and do not allow for flexibility of design and configuration of the resulting enclosure.

From the above discussion, it can be seen that it would be beneficial to improve the current state of portable animal enclosures by making the enclosures easier to deploy and to retract for storage, and by providing a portable enclosure that may be stored on a vehicle such as a trailer without creating a significant projection off the side of the trailer. It would be further beneficial to provide such a portable enclosure that is modular and configurable to meet a user's particular needs.

OBJECTS AND BRIEF SUMMARY OF THE INVENTION

The vehicle-mounted animal enclosure of the present invention has been developed in response to the present state of the art, and in particular, in response to the problems and needs in the art that have not yet been fully solved by currently available vehicle-mounted animal enclosures. Accordingly, it is an overall object of the present invention to provide a vehicle-mounted animal enclosure that overcomes many or all of the above-discussed shortcomings in the art.

To achieve the foregoing object, and in accordance with the invention as embodied and broadly described herein in the preferred embodiment, an improved vehicle carried animal enclosure is provided and in one embodiment comprises a portable enclosure or corral that may be mounted on a livestock trailer. The enclosure comprises a plurality of panels that extend from the trailer in a telescoping fashion to form an enclosure for temporality housing animals.

The panels may comprise vertical and horizontal support members coupled to each other with sleeves. The panels are preferably constructed to telescope or nest within one another when in a folded storage position. In one embodiment, a distal panel nests inside a proximal panel that is mounted to the trailer. In a further embodiment, the distal panel telescopically retracts partially into the proximal panel. Two such groups of panels are preferably separately mounted to a vehicle. This allows for a large enclosed area attached to the trailer, while the panels when stored protrude only slightly from the vehicle. The panels are preferably constructed of a lightweight material and pivot outward from the trailer with the majority of the weight of the panels being born by the trailer. The lightweight material of the panels also allows the panels to be configured into various deployed configurations with a minimum of effort.

Once the panels have been extended outward from the trailer they are preferably anchored to the ground through the use of retractable legs that may terminate in a base plate. In one embodiment, the base plate of the retractable legs may then be staked to the ground, providing secure anchor points for the enclosure. In another embodiment, stakes of rolled steel are placed through the joints of the panels and then are driven into the ground to provide a secure anchor point for the enclosure.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
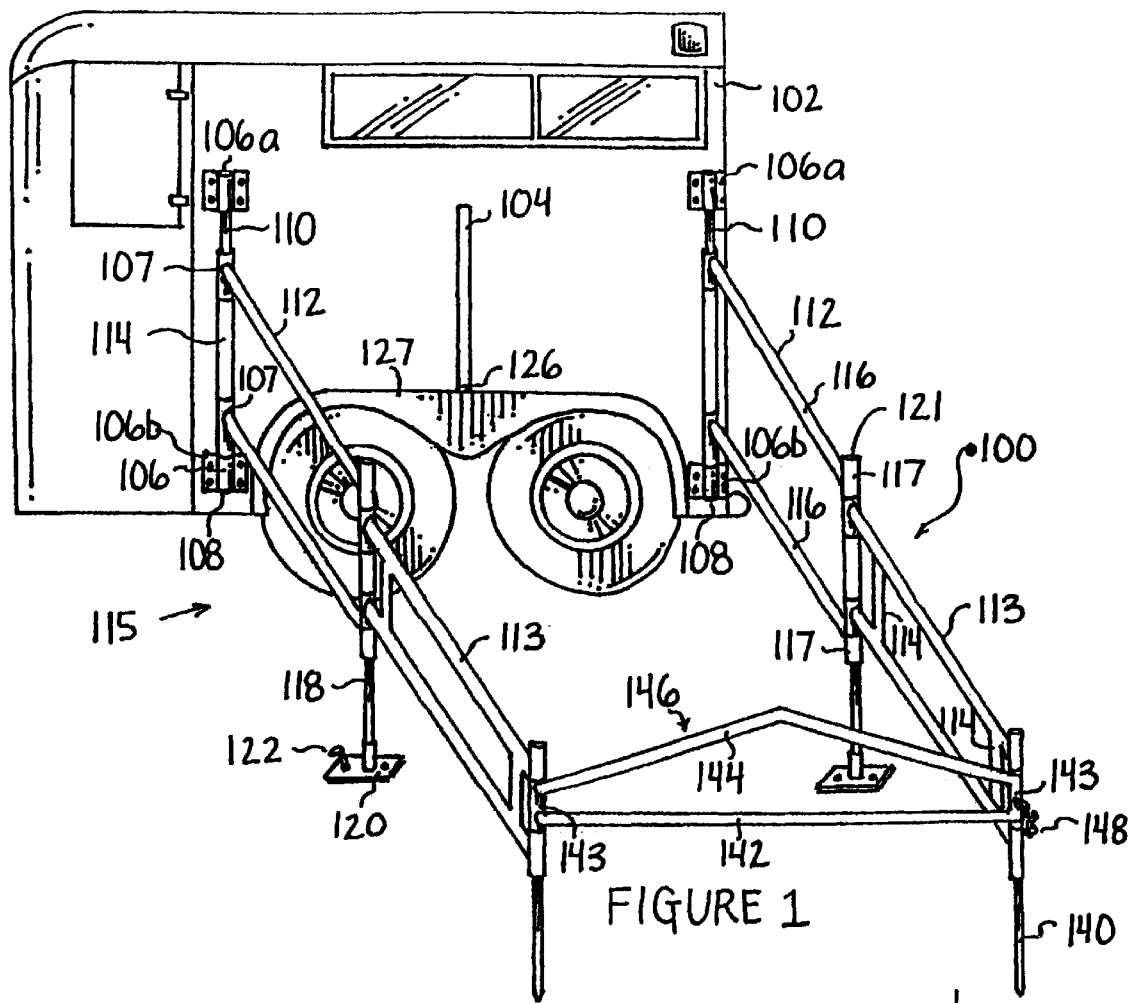
FIG. 1 is a partial perspective view illustrating one embodiment of an animal enclosure of the present invention in a deployed position.

FIG. 1 shows one embodiment of a vehicle-mounted animal enclosure 100 of the present invention in a deployed position useful for holding animals therein. As shown in FIG. 1, the vehicle-mounted animal enclosure 100 comprises two sets of panels (panel sets) 115 coupled to a vehicle. In the depicted embodiment, the vehicle comprises a livestock trailer 102, and each panel set 115 comprises a pair of panels, a proximal panel 112 and a distal panel 113. Of course, each panel set 115 could contain more than two panels.

The panel sets 115 are mounted to the trailer 102 with the use of four mounting brackets 106 which are shown attached in pairs to the trailer 102. The mounting brackets 106 are mounted in pairs of an upper bracket 106a and a lower bracket 106b, each pair of mounting brackets 106 pivotally mounting one of the panel sets 115. The upper brackets 106a are preferably hollow and are mounted toward the top of the trailer 102, while the lower brackets 106b are preferably capped at a bottom thereof with a metal cap 108 and are mounted toward the bottom of the trailer 102.

As depicted, a vertical support post 110 of each panel set 115 is inserted through the respective top bracket 106a and into the bottom bracket 106b to secure the panel set 115 to the trailer 102. This arrangement allows the animal enclosure 100 to be removably mounted to the vehicle 102. It also allows each panel set 115 to "float" on its mountings. Thus, each panel set 115 can be lifted into place on the top of a fender 127 of the trailer 102, can be lifted above the fender 127 during deployment, and can be lowered below the level of the fender 127 into a final deployed position.

Figure 2:
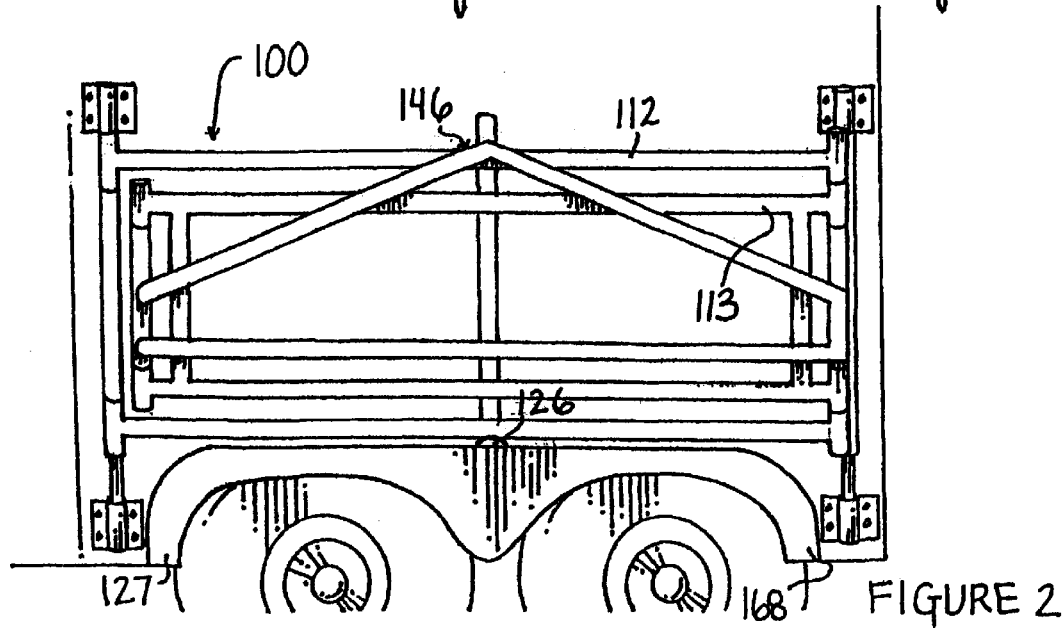
FIG. 2 is a side view illustrating one embodiment of an animal enclosure of the present invention collapsed for storage or travel.

The interconnected panels 112, 113 of each panel set 115 are shown pivotally and removably coupled to the vertical support post 110 with a pair of cylindrical metal sleeves 107. Each interconnected panel 112 and 113 in the depicted embodiment comprises two horizontal cross members 116 connected at a distal end by a vertical support member 114. The distal interconnected panel 113, is designed to have a perimeter smaller than the interior of the proximal interconnected panel 112. This allows the outer interconnected panel 113 to nest within the inner interconnected panel 112 when the enclosure is in the folded storage position for storage or transportation (as shown in FIG. 2). In the folded storage position, the thickness of the two combined panels 112, 113 is preferably no greater than the thickness of a single panel. Gates 146 may be connected to one or more of the panel sets 115 and may also nest inside the distal panel 113. In the embodiment shown, a single gate 146 is shown and is not configured to nest inside the panels 112, 113. Accordingly, the combined panel set 115 and gate 142 has the width of approximately two panels 112, 113.

The interconnected panels 112, 113 are shown connected with a hollow core 121 that passes through outer sleeves 117 of the proximal panel 112 and through a central sleeve 119 of the distal panel. The hollow core 121 is in one embodiment fixed to the outer sleeves 117, but the central sleeve 119 is free to pivot around the hollow core 121, allowing the distal panel 113 to pivot freely with respect to the proximal panel 112.

An extendable stake or pole 118 is shown passing through the hollow core 121, the outer sleeves 117 and the central sleeve 119 of each panel set 115 in order to anchor the panel set 115 to the ground. In one embodiment, the extendable pole 118 is fastened to a base plate 120 and has a series of holes or slots for receiving a pin that passes through the panel 112, 113 and the pole 118 to attach the pole 118 to the panel 112, 113 at various heights. When the extendable pole 118 is inserted into the hollow core 121 of the interconnected panel 112 and secured with the pin, an anchor may be formed by driving stakes 122 through holes provided in the base plate 120. In an alternative embodiment, a stake 140, preferably formed of rolled steel, is inserted into the central core 121 and driven directly into the ground. Such an arrangement is shown anchoring a joint of the interconnected panel 113 and the gate 146. Of course, any combination of extendable poles 118 terminating in a base plate 120 and stakes 140 may be used to anchor the enclosure 100 when in the deployed position.

The gate 146 may be fasted to a far end of the distal panels 113. The gate 146 preferably comprises two vertical support members 143 rotationally coupled to the outer interconnected panel 113. The depicted gate 146 further comprises a horizontal cross member 142 and a bent support member 144. The bent support member 144 adds height to the gate assembly, and thus is useful in preventing animals from jumping over the gate assembly.

Any suitable mechanism may be used to fasten the gate to the panel sets 115. In one the depicted embodiment, one end of the gate 146 is fastened using outer sleeves 117, a central sleeve 119, and a hollow core 121 as discussed above. The gate 146 is detachably latched to the other panel set 115 using a mechanism such as a chain fastener to the distal panel 113 which passes around the end of the gate and fits into a slot as know in the art.

Figure 4:
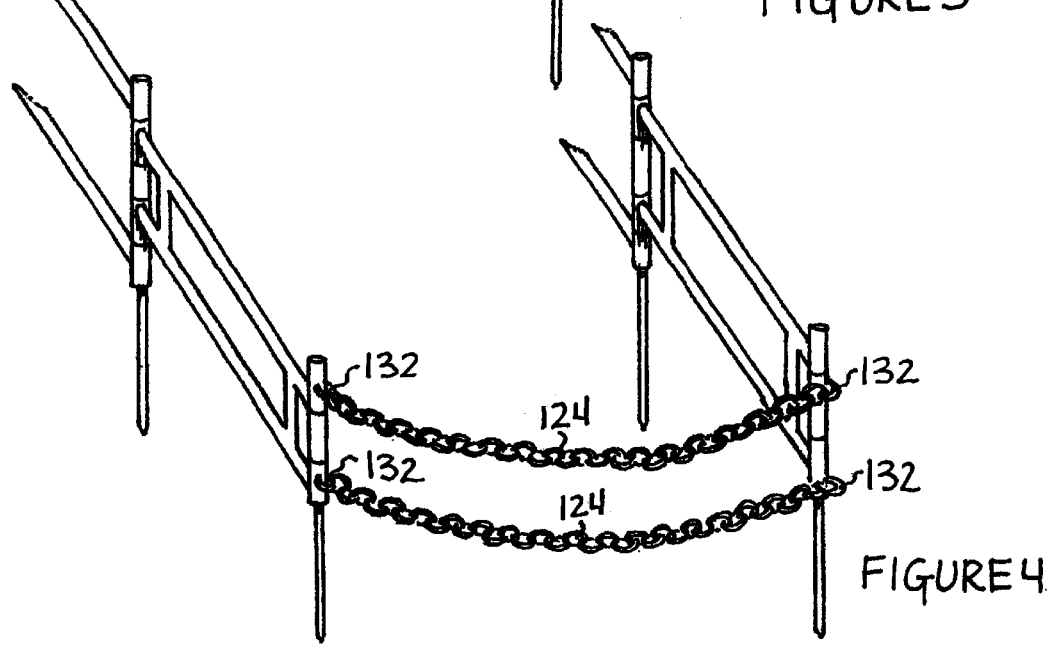
FIG. 4 is a perspective view illustrating one embodiment of a gate for use with the animal enclosure of the present invention.

In an alternate embodiment of FIG. 4, a plurality of links of chain 132 are affixed to a distal end of the gate 146 as shown in FIG. 4. The links of chain 132 are then used to secure two vinyl coated chains 124 across the end of the enclosure. The chains 124 act as a gate and may have the distal ends thereof connected with a clip, device or the like.

The brackets 106, vertical support post 110, interconnected panel assembly 112, gate 146, and extension poles 118 are preferably formed of chrome molybdenum alloy (chrome moly) tubing. Alternatively, aluminum tubing could be used. Of course, any material that meets the specifications of being relatively lightweight and durable may be uses.

Shown affixed to the livestock trailer 102 is a cushioning strip 104. The cushioning strip 104 is affixed vertically to the trailer 102 such that when the animal enclosure 100 is placed in the folded storage position for storage or transportation, the trailer 102 is not damaged. In one embodiment, the cushioning strip 104 is removable, comprising for instance, a segment of cylindrical foam pipe insulation. Also shown is a cushioned cradle 126 that is affixed horizontally to the fender 127 of the trailer 102. The cushioned cradle 126 prevents damage to the trailer 102 and provides support for the enclosure assembly 100 while allowing the enclosure assembly 100 to ride on the fender 127 of the livestock trailer 102 without excessive movement.

Figure 1A:
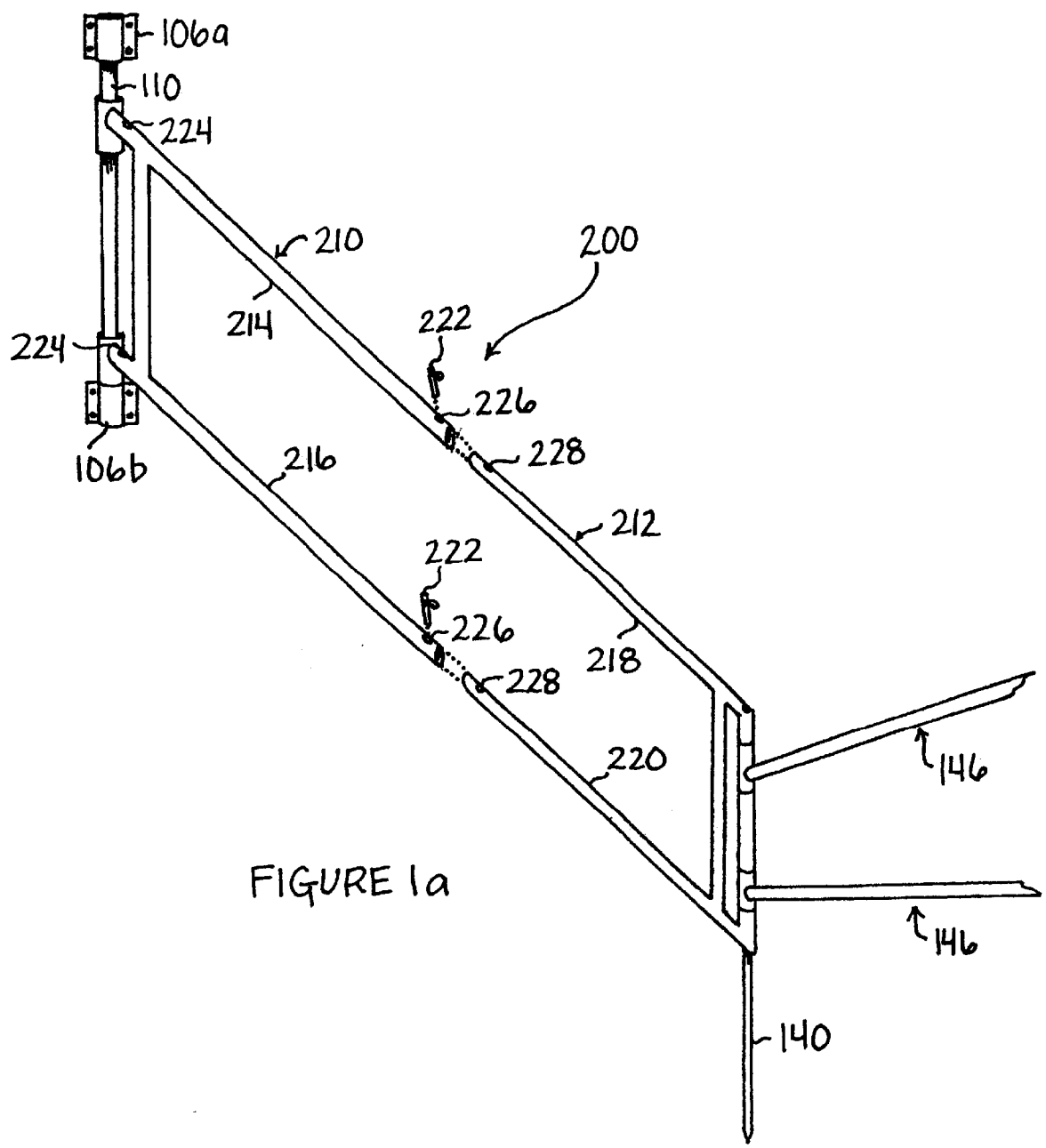
FIG. 1a is a partially exploded perspective view illustrating an alternative embodiment of panels of the present invention.

FIG. 1a is a partially exploded view of an alternate embodiment of a panel set of the present invention. The depicted panel set 200 is shown configured in a telescoping arrangement with a proximal panel 210 connected to the trailer 102 with the previously discussed brackets 106a, 106b and vertical support post 110. A distal panel 212 is telescopically engaged within the proximal panel 210. A plurality of cylindrical rails 214, 216 are provided on the proximal panel 210 and a plurality of smaller dimensioned cylindrical rails 218, 220 are provided on the distal panel 212. The smaller dimensioned cylindrical rails 218, 220 are slidably received within the larger dimensioned cylindrical rails 214, 216 of the proximal panel 210.

The panel set 200 of FIG. 1a is preferably configured to telescope between a stored position and one or more deployed positions. In the stored position, the distal panel 212 is fully retracted within the proximal panel 210. The distal panel 212 may be secured in the storage position using a pair of pins 222 which are inserted through holes 224 in the proximal panel 210 and through holes 228 in the distal panel 212. Alternatively, a press button or other arrangement may be used.

In the deployed position, the distal panel 212 is extended outward and is partially engaged within the proximal panel 210. The distal panel 212 is secured to the proximal panel 210 in the deployed position by passing the pins 222 through holes 226 on the distal ends of the rails 214, 216 and through the holes 228 on the distal panel 212. Of course, more holes could be positioned at different locations on the proximal panel 210 to make the length of the panel set 200 variable and adjustable. As with the embodiment of FIG. 1, a gate 146 may be attached to the panel set 200 as shown. Two or more such panel sets 200 may be attached to the trailer 102 to make one or more enclosures.

FIG. 2 shows a vehicle-mounted animal enclosure of the present invention in the folded storage position. As shown in FIG. 2, the interconneted panels 112 and 113 are folded with the outer panel 113 nesting within the inner panel 112 with the gate 146 folded in front of the interconnected panels 112 and 113. The cradle 126 is affixed to the fender 127 of the trailer and preferably comprises a strip of resilient material such as rubber, of which the distal end preferably widens to retain the panel assemblies 115 therein. Thus, when folded, the vehicle-mounted animal enclosure 100 rides securely on the fender 127 of the trailer 102.

Due to the light weight of the panel sets 115 and the particular manner of mounting the panel sets 115 to the trailer 102, the enclosure 100 can be transitioned between the folded storage position of FIG. 2 and the deployed position of FIG. 1 easily. Preferably, the mounting structure 110, 106 transfers all or substantially all of the weight of the panel sets 115 to the vehicle 102 during deployment of the enclosure 100. Accordingly, a user merely has to grasp the panels 112, 113 and pull lightly upward on the panels 112, 113 without substantially carrying the weight of the panels 112, 113 while transitioning between the deployed position and the storage position and vice verse.

Figure 3:
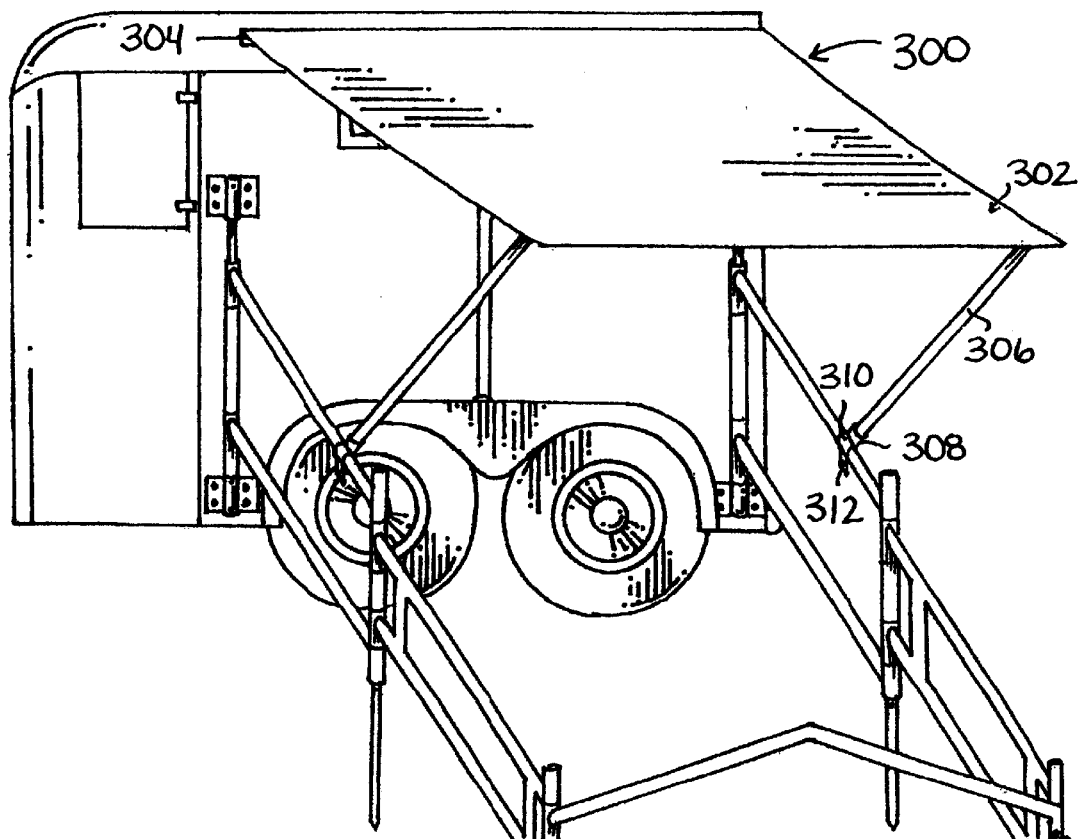
FIG. 3 is a partial perspective view illustrating one embodiment of an optional shade canopy for use with the animal enclosure of the present invention.

FIG. 3 is a partial perspective top view illustrating one embodiment of an optional shade canopy assembly 300 for use with the animal enclosure of the present invention. The shade canopy assembly 300 is shown attached to the proximal panel 112 through the use of a metal sleeve 310 slidably coupled to the horizontal cross member 116 of the inner interconnected panel 112. The metal sleeve 310 is preferably secured in place by a wing nut 312. A second metal sleeve 308 is attached to the first metal sleeve 310 and is configured to hold the awning support arm 306. The awning support arm 306 is configured to slide into the metal sleeve 308 and support the awning 302 above the vehicle-mounted animal enclosure 100. The awning 302 may be self retracting into an awning case 304 for storage when not in use. The awning case 304 is preferably detachably mounted to the trailer 102 and configured in such a manner that it may be quickly removed when desired.

Figure 5:
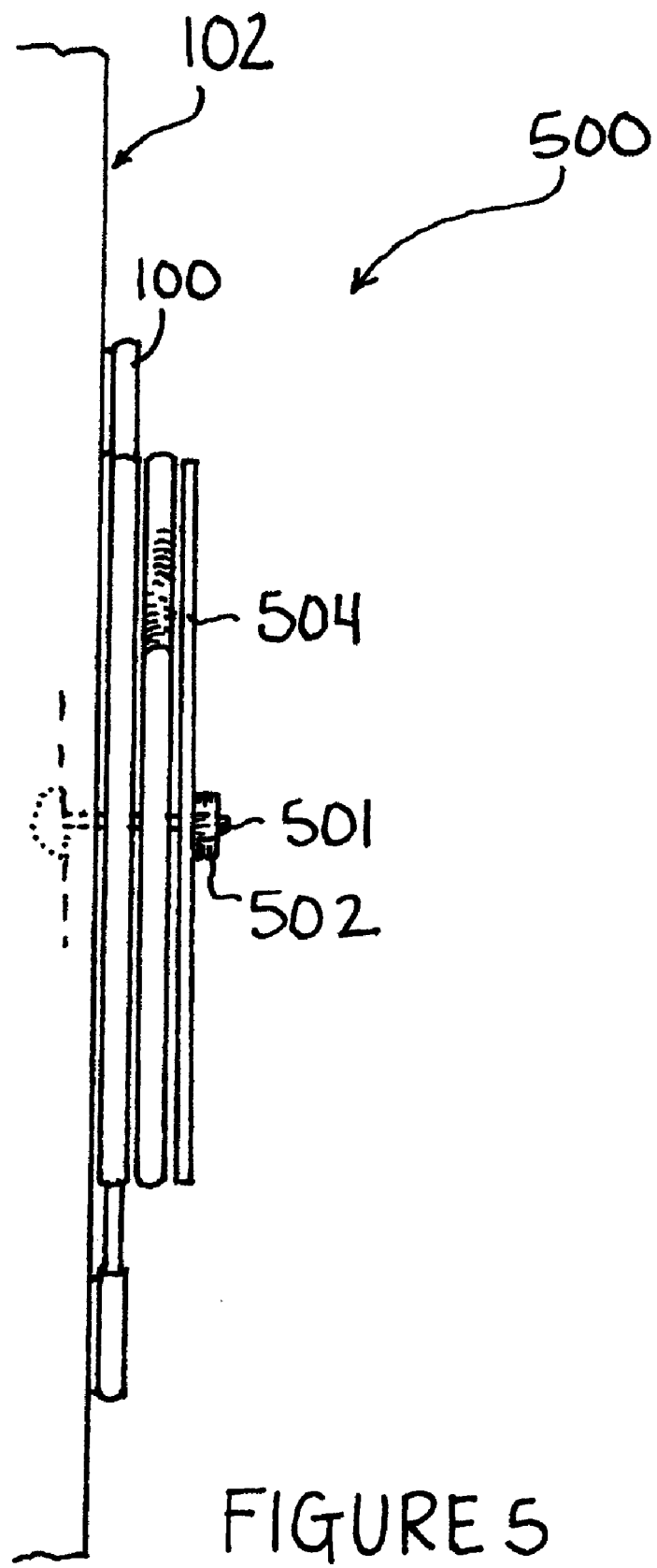
FIG. 5 is a side view illustrating one embodiment of one manner of securing the folded animal enclosure to the trailer.

FIG. 5 is aside view illustrating one embodiment of a securing assembly 500 for securing the panel sets 115 to the trailer 102 when in the folded storage position. The securing assembly 500 as shown comprises a bolt 501 and a locking nut 502 coupled to the vehicle. Threads are preferably provided in or attached to the vehicle 102 to receive the bolt 501. A strip of material 504, in one embodiment a ¼" steel plate, is placed across the folded vehicle-mounted animal enclosure 100 and held tightly in place by the locking nut 502. The strip of material 504 is configured to apply pressure to the panels 112, 113 of the vehicle-mounted animal enclosure 100 and keep them from swinging free of the vehicle while the vehicle is in motion.

Figure 5A:
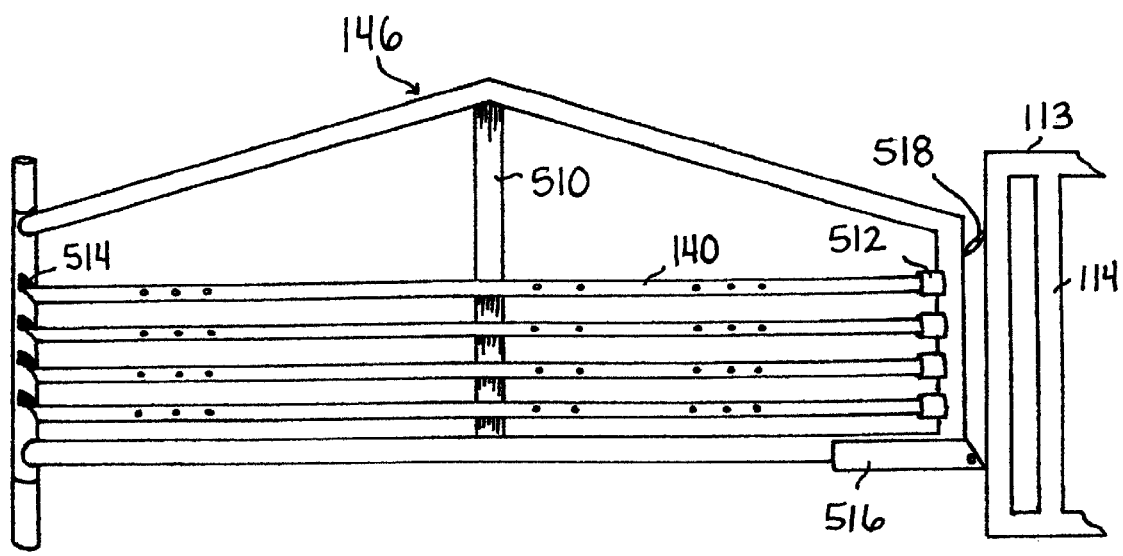
FIG. 5a is a side view illustrating an alternative embodiment of a gate of the animal enclosure of the present invention modified to conveniently store poles and stakes of the animal enclosure.

FIG. 5a is a side view illustrating one embodiment of a manner of securing the stakes 140 and poles 118 of FIG. 1 to the gate 146 and of latching the gate 146. In FIG. 5a, the gate 146 is shown provided with a center pole 510 fixed vertically across the center of the gate 146. The center pole 501 may be provided to add strength and also, in the depicted embodiment, to help hold the poles 118 and/or stakes 140 (hereinafter, just stakes 140) in place. Also provided are cylindrical bases 512 and slots 514.

The stakes 140 may be stored on the gate by placing a first end of each stake 140 in a cylindrical base 512 and sliding a second end of the stake into a corresponding slot 514. Preferably, the strip of material 504 of FIG. 5 covers the stakes 140 and holds them against the center pole 510, securing them in place. In this manner, the stakes 140 may be removably stored on the gate 146 when the animal enclosure 100 is in the storage position during storage and travel.

Also shown in FIG. 5a is a folding channeled brace 516 that may be fixed to a panel 113 to serve as a latch. The brace 516 preferably folds up vertically against the panel 113 and may be secured with a bracket 518 when in the stored position. When in the deployed position, the brace 516 is dropped to the horizontal position shown. The gate 146 is then lifted up over the sides of the brace 516 and off the brace 516 to open the gate and is lifted back onto the brace 516 to close the gate 146. For security purposes, a more secure and permanent latch such as the chain mentioned above is also preferably used when the animals are to be stored within the enclosure 100 for long periods of time.

Figure 6:
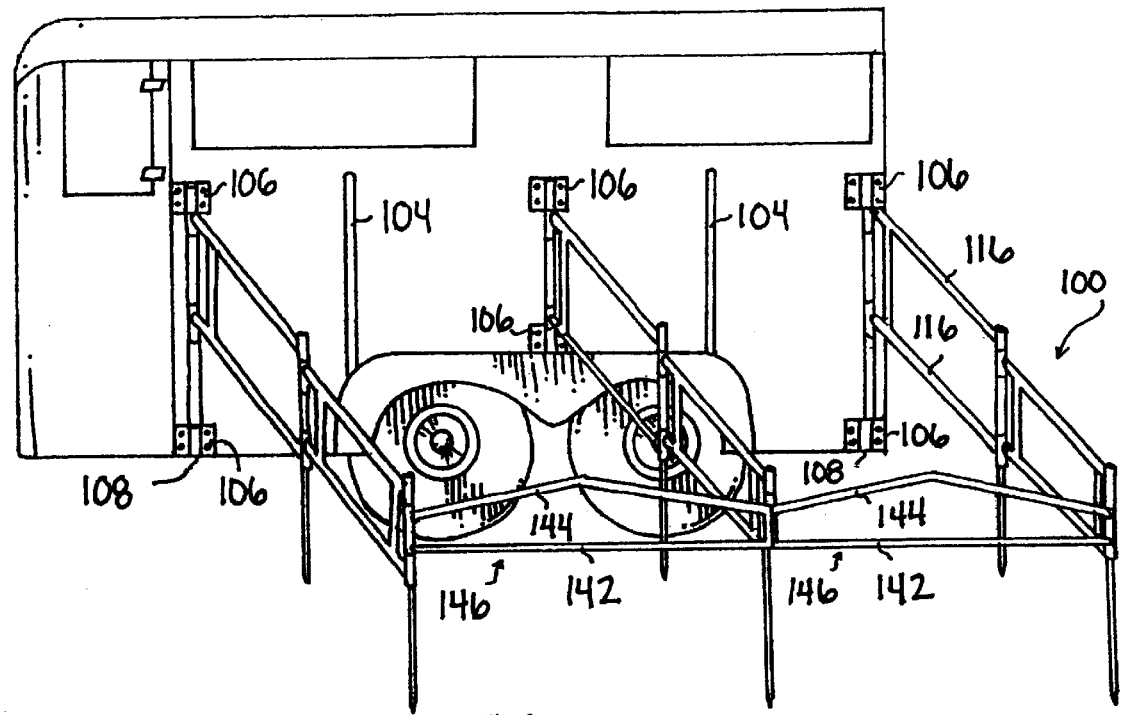
FIG. 6 is a partial perspective view illustrating a dual stall configuration of the animal enclosure of the present invention.
Figure 7:
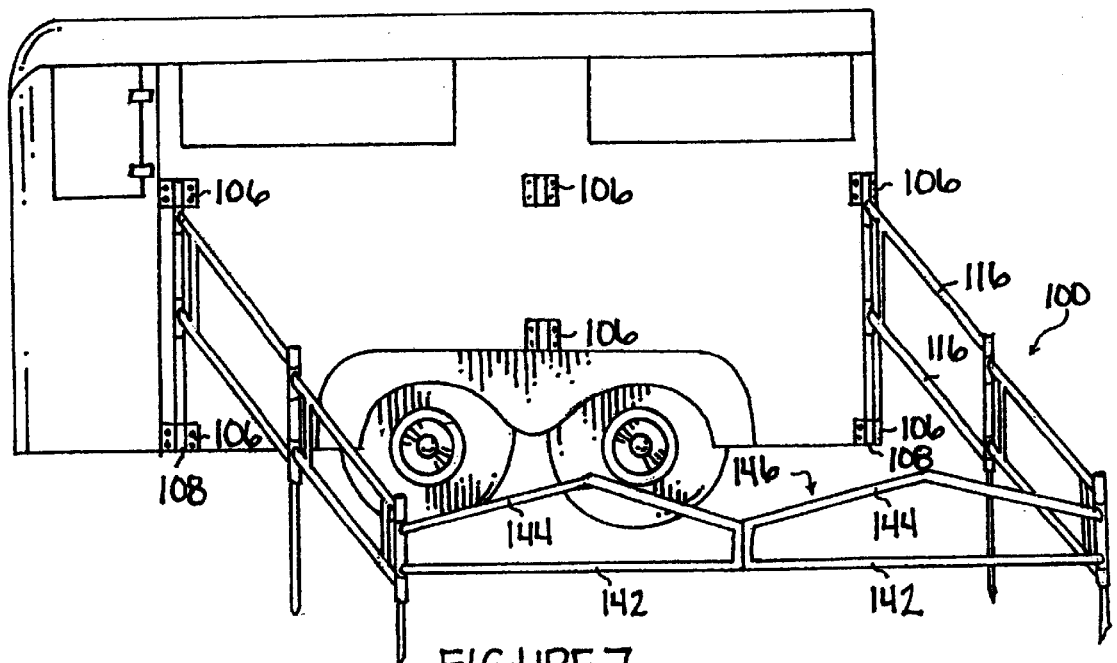
FIG. 7 is a partial perspective view illustrating a dual gate configuration of the animal enclosure of The present invention.

FIG. 6 shows one configuration in which three panel sets 115 are used to form two vehicle-mounted animal enclosures 100 attached to the same vehicle. FIG. 7 shows an additional configuration of two panel sets 115 attached to the same vehicle with two gates 146 to form a larger enclosure. As can be seen, the mounts 106 for the central panel set 115 remain in place, illustrating the ease of reconfiguring the animal enclosure 100.

Figure 8A:
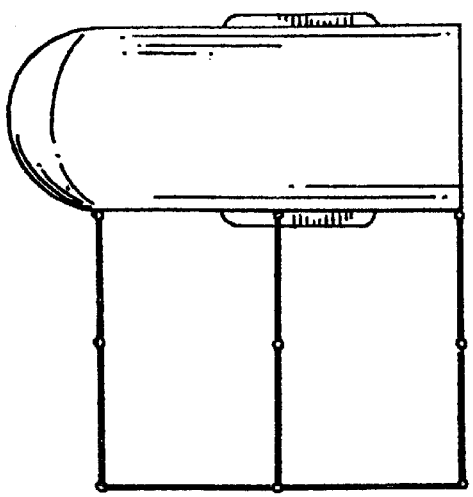
FIGS. 8a through 8g are top views illustrating different configurations of which the animal enclosure of the present invention is capable.
Figure 8B:
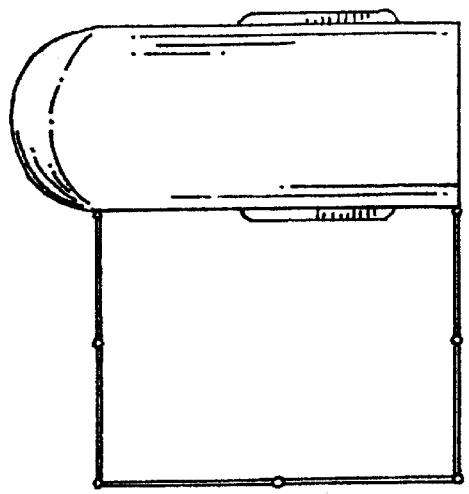
Figure 8C:
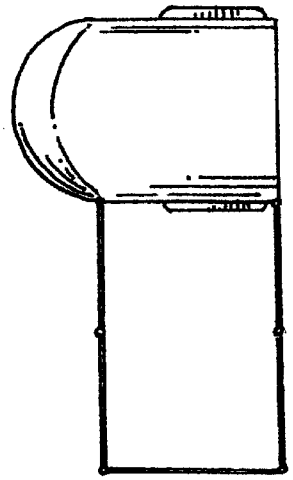
Figure 8D:
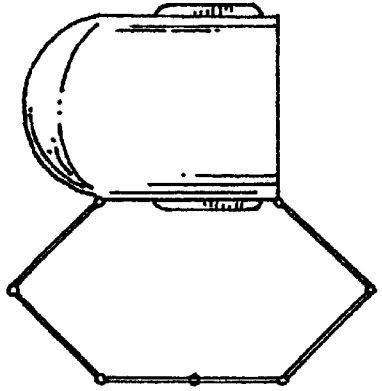
Figure 8E:
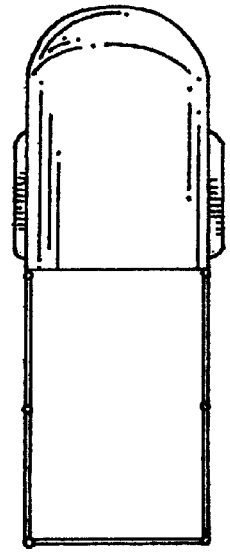
Figure 8F:
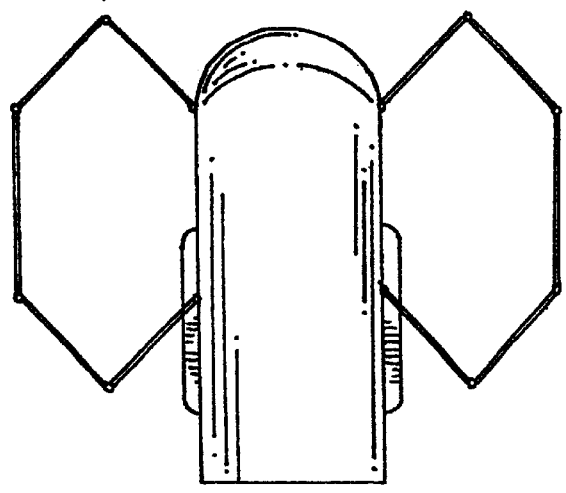
Figure 8G:
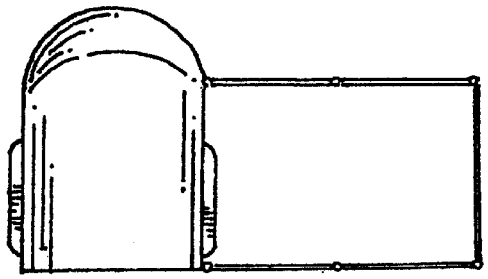

FIGS. 8a through 8g are alternate configurations of the animal enclosure 100 of the present invention, further illustrating the flexibility of configuration of the animal enclosure 100. FIG. 8g shows a trailer 102 with a vehicle-mounted animal enclosure 100 attached to one side of the trailer 102 and extended out from one side thereof in a rectangular fashion. FIG. 8f shows a trailer 102 with a vehicle-mounted animal enclosure 100 attached to each side of the trailer 102. The vehicle-mounted animal enclosure 100 are shown extended from the trailer 102 in a hexagonal shape.

FIG. 8e shows a trailer 102 with a vehicle-mounted animal enclosure 100 attached to the rear of the trailer 102 and extended from the rear of the trailer 102 in a rectangular shape. FIG. 8d shows a trailer 102 with a vehicle-mounted animal enclosure 100 attached to one side of the trailer 102 and extended from the side of the trailer 102 with a hexagonal shape. FIG. 8d also shows a dual gate configuration on a shorter trailer. With the dual gate configuration, the enclosure may be trapezoidal in shape, with the panel sets in a straight, parallel orientation rather than cornered and the distal end formed by the dual gates wider than the proximal end formed by the trailer. In the dual gate arrangement, a stake may be inserted through and connected with a cylindrical metal sleeve attached to one of the gates at the junction of the two gates to anchor the gates in place.

FIG. 8c shows a trailer 102 with a vehicle-mounted animal enclosure 100 attached to a side of the trailer 102 opposite that of FIG. 8g and extended from the trailer 102 in a rectangular shape. FIG. 8b shows a longer trailer 102 a vehicle-mounted animal enclosure having two panel sets 115 attached to one side of the trailer 102 and extending from the trailer 102 in a rectangular shape. AS discussed above with respect to FIGS. 6 and 7, the vehicle-mounted animal enclosures 100 of FIG. 8b are shown with the common center panel set 115 of the enclosures 100 removed, thus forming one large corral against the side of the trailer 102.

FIG. 8a shows a trailer 102 with two vehicle-mounted animal enclosures 100 attached to one side of the trailer 102 and extending from the trailer 102 in a rectangular shape. The enclosures 100 of FIG. 8a are shown with the common center panel set 115 in place, thus forming two enclosures against the side of the trailer 102. Of course many other configurations are possible due to the unique and flexible nature of the animal enclosure of the present invention, and those shown herein are merely examples of the many configurations possible.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A vehicle-mounted animal enclosure comprising:
   a mounting structure configured to attach to a vehicle; and
   a plurality of interconnected panels pivotally coupled to the mounting structure and adapted to be carried by the vehicle when in a storage position and to pivot from the storage position into a deployed position forming an enclosure for containing animals, the mounting structure configured to carry substantially the entire weight of the interconnected panels when the interconnected panels are pivoted into the deployed position;
   wherein the animal enclosure is adapted to be readily transitioned between a plurality of different deployed configurations.

2. The vehicle-mounted animal enclosure of claim 1, wherein the mounting structure comprises:
   upper and lower sleeves mounted to the trailer for slidably receiving a support post, the upper sleeve being hollow and disposed above the lower sleeve and the lower sleeve having an opening and a capped bottom; and
   a removable vertical support post passing through the upper sleeve and into the lower sleeve, one of the interconnected panels pivotally and removably coupled to the support post such that the weight of the plurality of interconnected panels is substantially carried by the vehicle.

3. The vehicle-mounted animal enclosure of claim 1, wherein the plurality of interconnected panels nest inside one another when folded for storage or transportation.

4. The vehicle-mounted animal enclosure of claim 1, wherein the plurality of interconnected panels comprise a proximal panel and a distal panel, the distal panel telescopically mounted within the proximal panel.

5. The vehicle-mounted animal enclosure of claim 3, wherein the thickness of the plurality of interconnected panels when folded for storage or transportation is not substantially greater than the thickness of a single panel of the plurality of interconnected panels.

6. The vehicle-mounted animal enclosure of claim 1, wherein the plurality of interconnected panels comprises a first plurality of interconnected panels, and further comprising a second plurality of interconnected panels, the first and second plurality of interconnected panels forming a single enclosure when in the deployed position.

7. The vehicle-mounted animal enclosure of claim 6, further comprising a third plurality of interconnected panels, the first, second, and third plurality of interconnected panels forming a plurality of enclosures for holding animals when in the deployed position.

8. The vehicle-mounted animal enclosure of claim 1, further comprising a plurality of detachable extension poles and wherein the plurality of interconnected panels are interconnected with joints, each joint having an opening therein for receiving the detachable extension poles to secure the interconnected panels in place when in the deployed position.

9. The vehicle-mounted animal enclosure of claim 8, further comprising a plurality of base plates, and wherein the detachable extension poles are adapted to connect to the base plates.

10. The vehicle-mounted animal enclosure of claim 8, wherein openings of the joints comprise hollow cores, the hollow cores each having a hollow center for receiving a detachable extension pole therethrough.

11. The vehicle-mounted animal enclosure of claim 1, wherein the interconnected panels are readily removable from the vehicle by pulling a removable vertical support post out of the mounting structure.

12. A vehicle-mounted animal enclosure comprising:
   a mounting structure configured to attach to a vehicle; and
   a plurality of interconnected panels pivotally coupled to the mounting structure and adapted to be carried by the vehicle and rest one within another when in a storage position and to be transformed from the storage position into a deployed position forming an enclosure for containing animals, the mounting structure configured to carry substantially the entire weight of the interconnected panels when the interconnected panels are transformed into the deployed position.

13. The vehicle-mounted animal enclosure of claim 12, wherein the mounting structure comprises:
   upper and lower sleeves mounted to the vehicle for slidably receiving a support post, the upper sleeve being hollow and disposed above the lower sleeve and the lower sleeve having an opening and a capped bottom; and a removable vertical support post passing through the upper sleeve and into the lower sleeve, one of the interconnected panels pivotally and removably coupled to the support post such that the weight of the plurality of interconnected panels is substantially carried by the vehicle.

14. The vehicle-mounted animal enclosure of claim 12, wherein the thickness of the plurality of interconnected panels when folded for storage or transportation is not substantially greater than the thickness of a single panel of the plurality of interconnected panels.

15. The vehicle-mounted animal enclosure of claim 12, wherein the plurality of interconnected panels comprises a first plurality of interconnected panels, and further comprising a second plurality of interconnected panels, the first and second plurality of interconnected panels forming a single enclosure when in the deployed position.

16. The vehicle-mounted animal enclosure of claim 15, further comprising a third plurality of interconnected panels, the first, second, and third plurality of interconnected panels forming a plurality of enclosures for holding animals when in the deployed position.

17. The vehicle-mounted animal enclosure of claim 12, further comprising a plurality of detachable extension poles and wherein the plurality of interconnected panels are interconnected with joints, each joint having an opening therein for receiving the detachable extension poles to secure the interconnected panels in place when in the deployed position.

18. The vehicle-mounted animal enclosure of claim 17, further comprising a plurality of base plates, and wherein the detachable extension poles are adapted to connect to the base plates.

19. The vehicle-mounted animal enclosure of claim 12, wherein the animal enclosure is adapted to be readily transitioned between a plurality of different configurations.

20. The vehicle-mounted animal enclosure of claim 12, wherein the interconnected panels are removable from the vehicle by pulling a removable vertical support post out of the mounting structure.

21. A vehicle-mounted animal enclosure comprising:
a mounting structure comprising:
  upper and lower sleeves configured to be mounted to a vehicle for slidably receiving a removable vertical support post, the upper sleeve being hollow and disposed above the lower sleeve and the lower sleeve having an opening and a capped bottom; and
  the removable vertical support post passing through the upper sleeve and into the lower sleeve, a plurality interconnected panels pivotally and removably coupled to the removable vertical support post such that the weight of the plurality of interconnected panels is substantially carried by the vehicle, such that the interconnected panels are removable from the vehicle by pulling the removable vertical support post out of the mounting structure;
the plurality of interconnected panels pivotally coupled to the mounting structure and adapted to be carried by the vehicle and nest one within another when in a storage position and to pivot from the storage position into a deployed position forming an enclosure for containing animals, the mounting structure configured to carry substantially the entire weight of the interconnected panels when the interconnected panels are pivoted into the deployed position;
a plurality of detachable extension poles and wherein the plurality of interconnected panels are interconnected with joints, each joint having an opening therein for receiving the detachable extension poles to secure the interconnected panels in place when in the deployed position, wherein openings of the joints comprise hollow cores, the hollow cores each having a hollow center for receiving a detachable extension pole therethrough; and
a gate attached to one of the interconnected panels and adapted for being quickly latched to allow ready ingress of animals into the enclosure and egress of animals from the enclosure.

* * * * *

UNITED STATES PATENT AND TRADEMARK OFFICE
CERTIFICATE OF CORRECTION

PATENT NO. : 6,467,433 B1
DATED : October 22, 2002
INVENTOR(S) : Paul D. Stanton and Connie M. Stanton It is certified that error appears in the above-identified patent and that said Letters Patent is hereby corrected as shown below:

Column 1,
Line 37, "ways" should read -- way --.

Column 2,
Line 2, "temporality" should read -- temporarily --.

Column 3,
Line 5, "The" should read -- the --.
Line 50, "113," should read -- 113 --.

Column 4,
Line 33, "one the" should read -- one of the --.
Line 51, "uses" should read -- used --.

Column 5,
Line 55, "verse" should read -- versa --.

Column 6,
Line 7, "aside," should read -- a side --.
Line 66, "enclosure" should read -- enclosures --.

Column 7,
Line 19, "102 a" should read -- 102 with a --.
Line 22, "AS" should read -- As --.

Signed and Sealed this

Eighteenth Day of February, 2003

JAMES E. ROGAN
*Director of the United States Patent and Trademark Office*